C. TAYLOR.
Traction-Wheel.

No. 226,209.　　　　　　　　Patented April 6, 1880.

Witnesses:　　　　　　　　Inventor:
　　　　　　　　　　　　　Charles Taylor.
　　　　　　　　　　　　　Per
　　　　　　　　　　　　　　　Attorney.

UNITED STATES PATENT OFFICE.

CHARLES TAYLOR, OF MONTREAL, QUEBEC, CANADA, ASSIGNOR OF ONE-HALF OF HIS RIGHT TO GEORGE HIRAM KENDALL, OF SAME PLACE.

TRACTION-WHEEL.

SPECIFICATION forming part of Letters Patent No. 226,209, dated April 6, 1880.

Application filed February 11, 1880.

*To all whom it may concern:*

Be it known that I, CHARLES TAYLOR, of the city of Montreal, in the district of Montreal and Province of Quebec, Canada, have invented certain new and useful Improvements in Wheels; and I do hereby declare that the following is a full, clear, and exact description of the same.

My invention has reference specially to the wheels of those classes of machines such as mowers, reapers, &c., which have to work both along the road and in heavy ground, and makes it possible to dispense with a large proportion of the weight necessary at present to give the requisite steadiness, and will also be found of great use for traction and like engines.

The way in which I propose to effect this is by mounting on the axle, on either face of the wheel, a shield carrying arms pivoted thereto, which, when the shield is turned in one direction, project radially through the tire of the wheel, and when the shield is turned in the other direction are withdrawn within the tire, being then tangential, or nearly so, to the periphery of the shield.

For full comprehension of the invention, reference must be had to the annexed drawings, in which—

Figure 2:
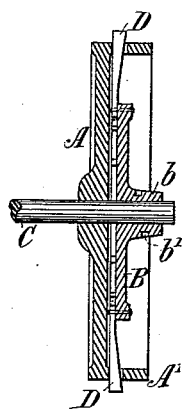
Figure 1:
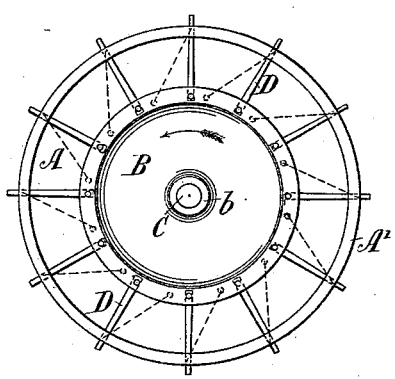

Figure 1 is a view of the wheel, and Fig. 2 a sectional elevation of same.

Similar letters of reference indicate like parts.

A is the wheel proper, of any usual construction suitable for the particular class of machine to which it is applied, secured on the axle in any desired way. A' is the tire, formed to project on one side.

B is the shield, of any diameter proportional to the wheel, with hub *b* mounted, as shown, on the axle C, so as to revolve therewith, this shield being placed either on the inside or outside of the wheel, and so arranged as to be turned the desired proportion of a revolution by means of a screw-wrench or lever fitting into suitable holes *b'*, formed in the hub or ring and worked by the driver; or it may be operated by gears working in the periphery or other part of the wheel, or any other means or device may be used, according to the construction of the machine to which it is applied.

To or near the periphery of the shield B are pivoted arms D D, of any shape found suitable, these, when the shield is turned in one direction, projecting outward any desired distance through the tire, so as to give the wheel a gripe upon the ground when the machine is doing heavy work. When the machine is to pass along a road, these arms are, by partial rotation of the shield in the manner before described, withdrawn inside the tire, assuming then the positions shown by dotted lines in Fig. 1—*i. e.*, tangential, or nearly so, to the periphery of the shield.

By this arrangement great steadiness and easiness of draft are secured when the machine is traveling on the road, and that without injury to the road-bed, and in the field the hold on the ground is very strong, allowing the large proportion of extra weight now required, especially for mowers and reapers, as before mentioned, to be dispensed with.

What I claim is as follows:

The combination, with the wheel A, provided with tire A', of the shield B, mounted on the axle and capable of being partially rotated, so as when in one position to force out radially arms D D through the tire, and when in the other to withdraw them tangentially, or nearly so, to the periphery of the shield, substantially as herein set forth, and for the purposes described.

CHARLES TAYLOR.

Witnesses:
 FRAS. HY. REYNOLDS,
 R. ARTHUR KELLOND.